Sept. 29, 1936.　　　　J. W. BRYCE　　　　2,055,965
SCALE
Filed Feb. 19, 1931　　　3 Sheets-Sheet 1
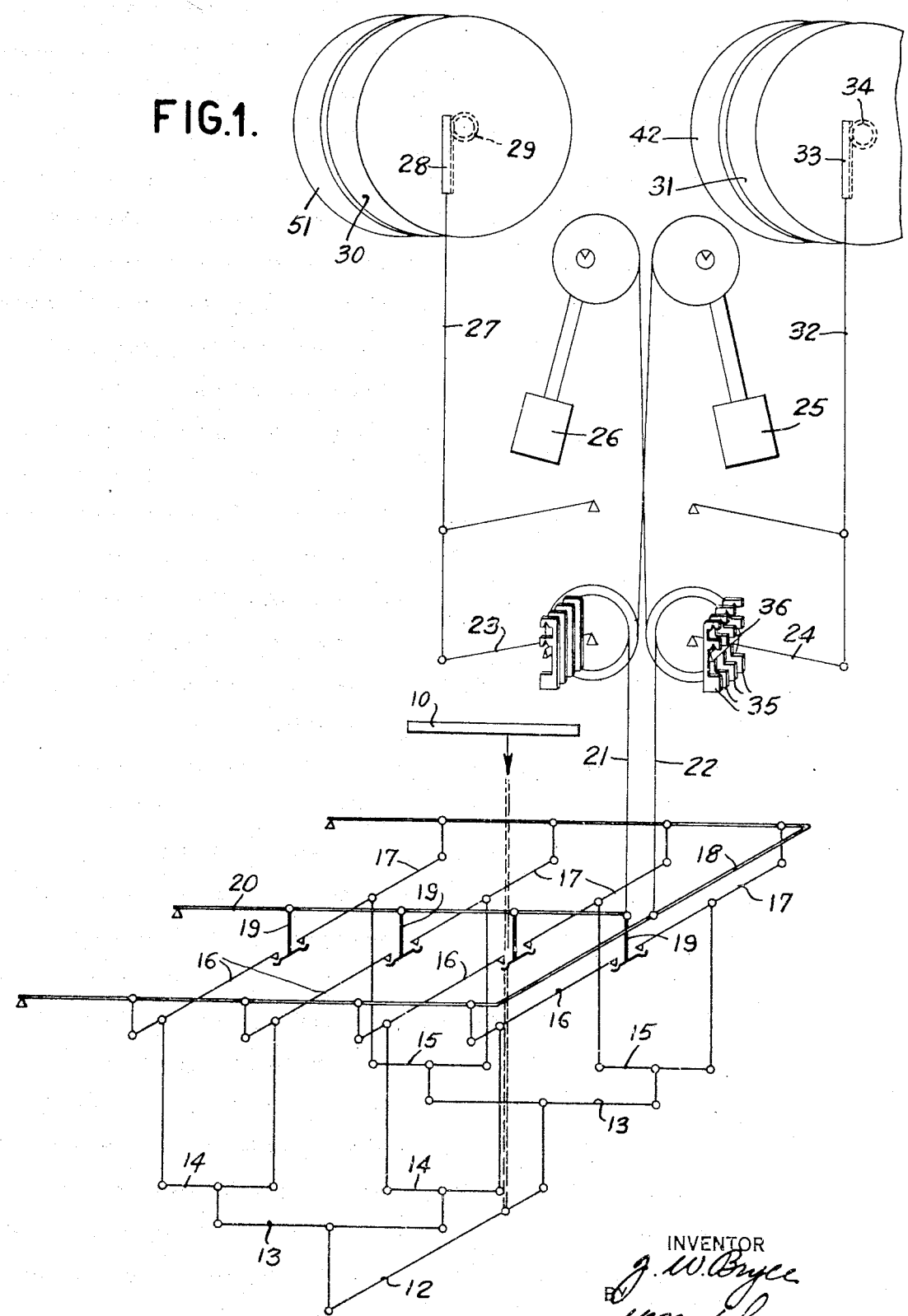

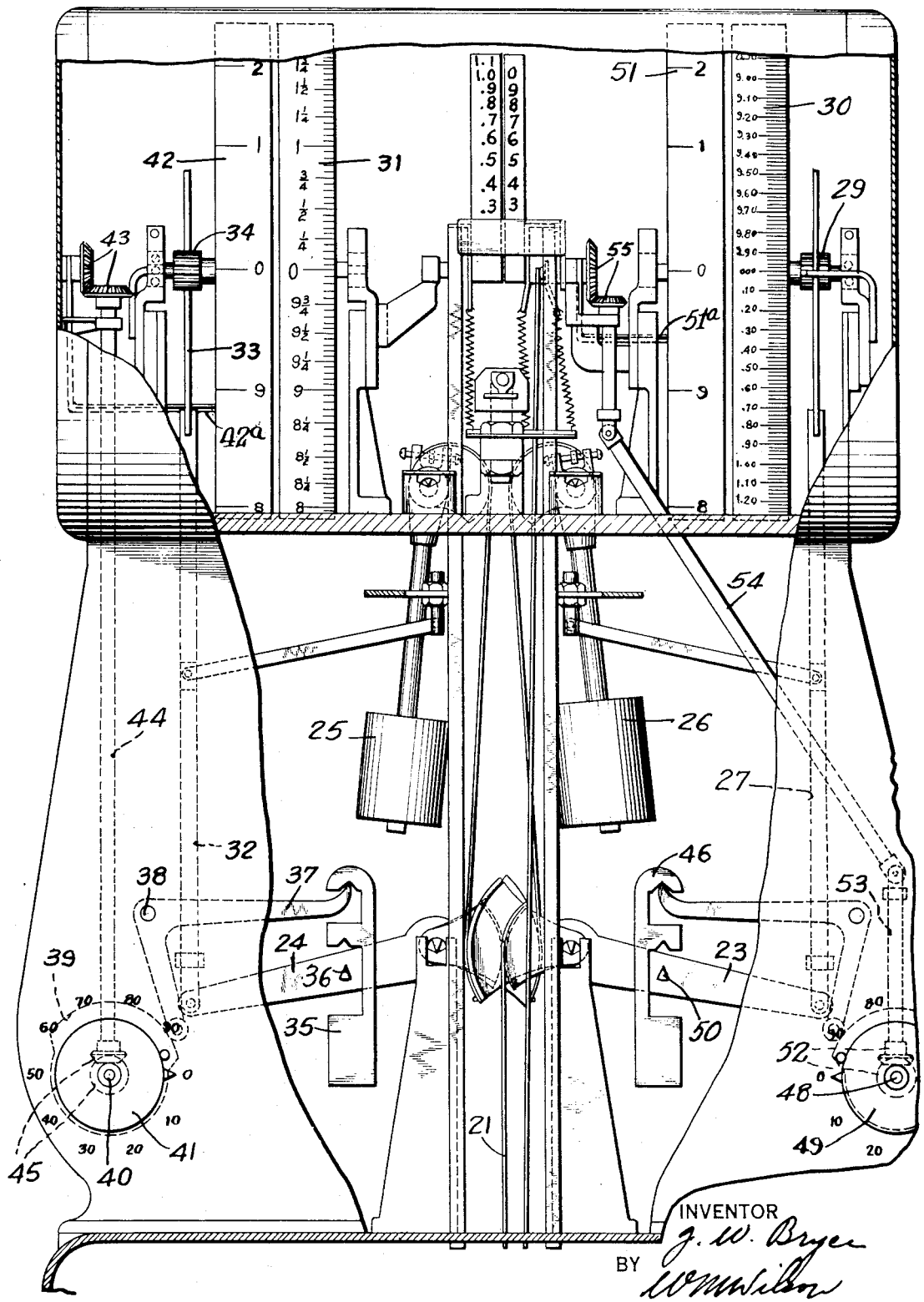

Sept. 29, 1936.                J. W. BRYCE                 2,055,965
                                  SCALE
                            Filed Feb. 19, 1931           3 Sheets-Sheet 3
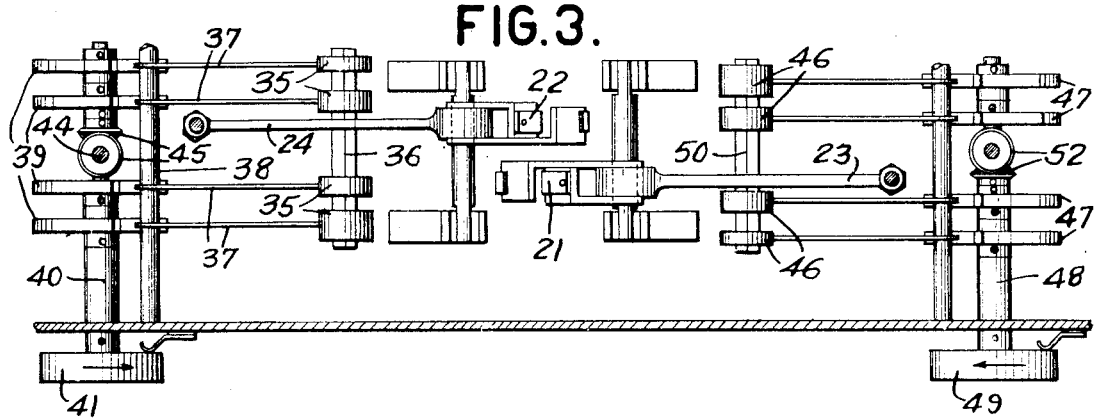
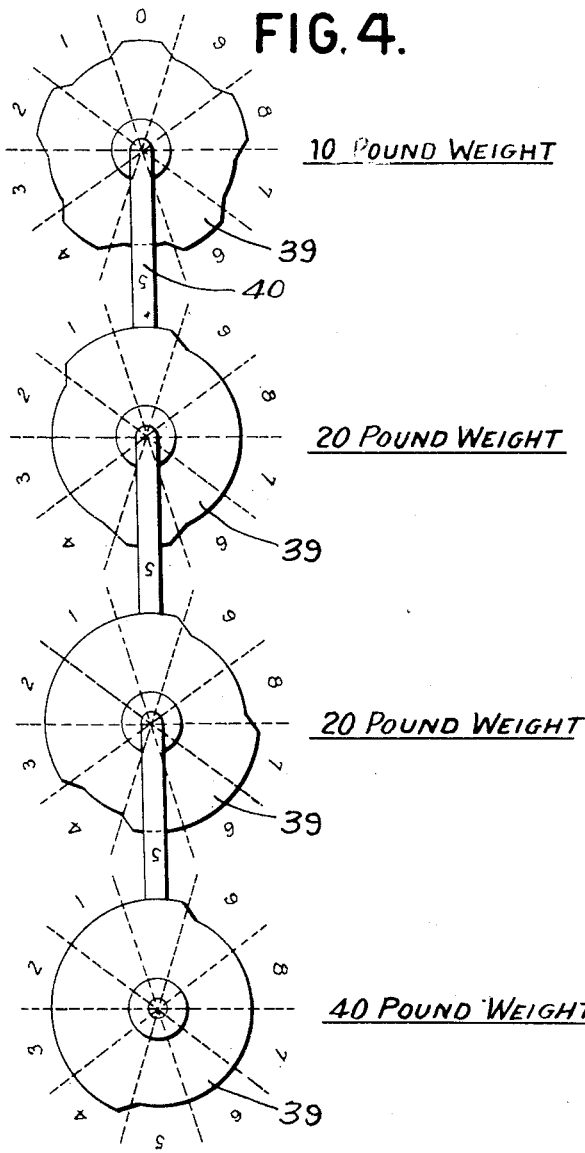

Patented Sept. 29, 1936

2,055,965

UNITED STATES PATENT OFFICE 2,055,965

SCALE

James W. Bryce, Bloomfield, N. J., assignor, by mesne assignments, to The Hobart Manufacturing Company, Troy, Ohio; a corporation of Ohio Application February 19, 1931, Serial No. 516,900

17 Claims. (Cl. 265—36)

The present invention relates to weighing scales in general and particularly to those of the types known as factor lever scales.

One form which a factor lever scale may take is illustrated and described in application Serial No. 176,005, filed March 17, 1927 by James W. Bryce, now Patent No. 1,791,951, granted February 10, 1931 which shows a computing scale having weighing mechanism, a weight indicator, a cost indicator, and a key-controlled factor lever system for setting up the unit price in a manner to control the cost indicator in accordance with the product of unit price and weight of load. Indicators are provided for the purpose of indicating the total weight of the load and the unit price so that the weight of the load, the unit price, and the product of the unit price and total load are all simultaneously visible through suitable sight openings.

The scale shown in the cited patent is restricted in its cost indicating capacity by the upper limit of the cost indicating drum which is determined by the product of the highest unit price it is possible to set up on the keys and the maximum weight that can be indicated on the weight drum. Since the specific scale described in said patent has a maximum weight indicating capacity of ten pounds and a maximum price capacity of $1.10 per pound, it follows that the limit of the cost indicating drum must be $11.00. Should a load of more than ten pounds be placed on the platform, the weight drum will turn more than a full revolution and will indicate a weight which is the difference between the true weight and ten pounds since the zero point also corresponds to the ten pound graduation. If the price per pound is such that the product of unit price and weight amounts to more than $11.00, the cost indicating drum will also turn more than a full revolution and will not display the true cost since the upper limit of the cost drum is not $10.00 and there is no transfer mechanism to cause tens of dollars to be automatically indicated when the cost drum turns more than one revolution.

It is usual to design a scale to meet the average demands of the class of business for which the scale may be intended so that the scale will have sufficient capacity to weigh loads within limits which have been determined by experience in the particular class of business involved. In a specific class of business it may be found that a scale having a weighing capacity up to ten pounds and a computing capacity up to $1.10 per pound will be sufficiently large to meet normal demands, however, there will be occasions when it may be necessary to weigh loads which are over the capacity of the scale. It is frequently the practice to provide a scale with some arrangement whereby such abnormal loads may be weighed in order to avoid the necessity of having two scales, one for ordinary use and the other to take care of occasional demands for a scale having a higher capacity.

The scale shown in Patent No. 1,791,951, hereinbefore mentioned, was designed to be used in a business in which loads seldom exceed ten pounds and in which unit prices are seldom over $1.10 per pound. Since a user of such a scale might occasionally wish to weigh loads materially in excess of ten pounds and automatically compute the total cost, it is desirable that some arrangement be provided to enable the user to increase the capacity of the scale beyond the normal capacity.

It is an object of the present invention to provide novel means for increasing the weighing and computing capacity of a scale of the computing type.

Another object is to provide means for visually indicating the increments by which the capacity of the weighing and computing mechanisms have been increased.

A further object is to provide mechanism for accomplishing the foregoing objects which is simple in construction and operation, requires few working parts, and may be readily incorporated in a scale without extensive alteration thereof.

Other objects, advantages, or features of the present invention will be pointed out in the following specification and claims or will be apparent from a study thereof and of the accompanying drawings.

In the drawings:

Fig. 1 is a diagrammatic view illustrating the principle upon which the present invention is based.

Fig. 2 is a front elevation of a scale embodying the present invention, part of the casing having been broken away to expose the parts to view.

Fig. 3 is a top view of the mechanism for controlling the various capacity weights.

Fig. 4 is a view illustrating the arrangement of the cams for controlling one set of capacity weights.

The broad principle of the present invention is illustrated diagrammatically in Fig. 1. The load is placed upon the platform 10 and the force due to the weight of the load is directed vertically downward upon a lever 12 at a point dividing said lever in the ratio of 4 to 1. The ends of lever 12 are suspended from the mid-points of levers 13 which in turn are suspended from the mid-points of levers 14 and 15, respectively. The levers 14 are suspended from factor levers 16 at points dividing said factor levers in the ratio of 4 to 1 while the levers 15 are suspended from the mid-points of factor levers 17. The ends of the short arms of factor levers 16 are suspended from the weight beam 18 while one end of each of the factor levers 17 is similarly suspended from the weight beam 18.

The free ends of all of the factor levers 16, 17 are supported by movable bearings which may be lowered singly or in combination by means of key-controlled mechanism, as described in Patent No. 1,791,951, to permit said free ends to rest upon pivot elements 19 spaced at equal intervals upon the price beam 20. The price beam and weight beam are freely pivoted upon fixed fulcrums and the opposite ends of said beams are connected by means of flexible tapes 21, 22, respectively, to segmental levers 23, 24 which operate the price and weight load offsetting means or pendulums 25, 26 by means of similar flexible tapes.

The segmental lever 23 is pivoted to a link 27 having a rack 28 pivoted at its upper end which meshes with a pinion 29 rigidly mounted upon the shaft carrying the drum supporting the cost chart 30. The chart 30 bears a series of graduations about its periphery representing amounts from $0.00 up to and including $9.99 and is adapted to be displaced by the price beam 20 in amounts proportional to the product of the weight of the load and the unit price set up on the keys as described in Patent No. 1,791,951. The segmental lever 24 actuates the weight chart 31 in a similar manner through a link 32, a rack 33, and pinion 34. The weight chart 31 has an indicating capacity up to ten pounds, the zero graduation corresponding to ten pounds also so that one full revolution of chart 31 represents a weight of ten pounds while a full revolution of chart 30 represents ten dollars as the value of the load on the platform.

The various ratios between the arms of the levers are such that one hundredth of the weight of the load on the platform is supported by each of the movable pivots carrying the free ends of factor levers 16 while one tenth of the weight of the load is supported by the corresponding movable pivots for factor levers 17. In other words the effect produced upon the price beam by permitting a factor lever 17 to rest upon said beam is ten times the effect produced by permitting the corresponding factor lever 16 to rest upon said beam.

Three of the pivot elements 19 are located distances from the fixed fulcrum of the price beam 20 equal, respectively, to one-fourth, one-half and three-quarters of the length of said beam, while the fourth element 19 is located at the free end of the beam to which is also connected the tape 21. It is clear that the full effect of the extreme right hand factor lever 16 upon the beam 20 will be to produce a pull of one-hundredth of the weight of the load upon the tape while the extreme left hand factor lever 16 will produce a pull on the tape 21 equal to only one-quarter of the effect produced by the extreme right hand factor lever 16. The second and third factor levers 16 from the left will correspondingly have only one-half and three-fourths of the effect of the extreme right hand factor lever 16. The same remarks apply to the factor levers 17 except that the effect of each is ten times greater than the corresponding factor lever 16. It is obvious that, by permitting various combinations of levers 16, 17 to affect the price beam 20, the said beam will be displaced distances proportional both to the weight of the load and to the price per pound. The factor levers 16 are combinationally applied to the beam 20 by means of the penny keys ranging from "1" to "10" while the factor levers 17 are applied by the tens of cents or dimes keys ranging from "1" to "10", the last-named value corresponding to a price of one dollar. It is apparent that unit prices ranging from $0.01 up to $1.10 may be set up on the keys and will cause a portion of the load on the platform to be applied to the beam 20 whereby the latter will be displaced proportionately both to the weight of the load on the platform and to the unit price set up by the keys.

The arrangement of the lever system is such that a certain fixed proportion of the load is used to directly actuate the weight beam 18 and weight chart 31, a second fixed proportion of the load is available at the free ends of the factor levers 16, 17 to control the cost indicating chart 30 in accordance with the weight of the load and the unit price, while the portion of the load remaining is applied to the fulcrums of the levers 18, 20.

Since the above mentioned proportions are fixed by the ratios of the various levers, it is possible to increase the capacity of the weighing mechanism in a simple manner without adversely affecting the price beam and the cost indicating chart, and also to increase the cost indicating capacity of the scale without adversely affecting the weight beam and the weight chart.

The means for increasing the capacity of the weight indicating mechanism to permit weighing loads in excess of ten pounds and indicating the true weight thereof will now be described. There is provided a series of four weights 35 of different values which are adapted to be lowered singly or in combination so as to rest upon a pivot element 36 attached to the segmental lever 24, each weight 35 being suspended freely from one arm of a bell crank 37 loosely journalled upon a fixed shaft 38 supported by the framework of the scale. The other arm of each bell crank 37 has an anti-friction roller in contact with a cam 39 fixed upon a shaft 40 which is loosely journalled in the framework and has fast thereto a knob or hand wheel 41 by means of which the shaft 40 and the cams 39 may be manually rotated as a unit. The cams 39 have different profiles which are so disposed that for each position to which the shaft 40 is turned a different weight 35 or combination of weights 35 will be lowered and permitted to rest upon the pivot element 36. The hand wheel 41 has an index or pointer thereon which may be brought into register with any numeral of a dial having the numerals 0, 10, 20, . . . to 90 inclusive. The dwells in the cams are so arranged that the weights 35 will be lowered according to the following table, it being understood that the smallest and largest weights are of a magnitude effective to counterbalance the pull on tape 22 due to loads of ten and forty pounds, respectively, placed upon the platform, while the effect of each of the other two weights 35 is to counterbalance the pull on tape 22 due to a load of twenty pounds on the platform:

| Dial | Weights lowered | Counterbalancing effect |
|---|---|---|
|  |  | Lbs. |
| 0 | None | None |
| 10 | 10 | 10 |
| 20 | 20 | 20 |
| 30 | 10, 20 | 30 |
| 40 | 40 | 40 |
| 50 | 10, 40 | 50 |
| 60 | 20, 40 | 60 |
| 70 | 10, 20, 40 | 70 |
| 80 | 20, 20, 40 | 80 |
| 90 | 10, 20, 20, 40 | 90 |

Since the pendulum weight is of sufficient size to counterbalance all loads up to ten pounds, it follows that any load from 0 lbs. to 100 lbs. may be weighed by turning the hand wheel 41 to the proper numeral. If, for instance, it is desired to weigh a load of 37 pounds, the hand wheel 41 will need to be turned to "30" thereby lowering one of the 20 lb. weights 35 and the 10 lb. weight 35 upon the pivot element 36 thereby offsetting a portion of the pull upon tape 22 proportional to 30 lbs. of the load upon the platform so that the chart 31 will indicate 7 lbs.

Pivotally mounted adjacent the left side of chart 31 and concentric therewith is a drum having a chart 42 bearing the numerals "0" to "9" inclusive. Secured to the drum is an L-shaped arm 42a (Fig. 2) extending to the left and inwardly toward the axis of the drum. At this point the arm is secured to one of two bevel gears 43 which may be journaled on a fixed stud coaxial with the drum so that rotation of said bevel gear rotates the drum. The other bevel gear 43 is secured to a vertical shaft 44 journaled in the framework. Bevel gears 45 connect shafts 40 and 44 for driving purposes so that rotation of hand wheel 41 to vary the weighing capacity of the scale causes the drum carrying chart 42 to be rotated in proportion to the rotation of hand wheel 41. In other words, turning of the hand wheel 41 to "30" will cause the numeral "3" to become visible through the sight opening provided for viewing the charts 31 and 42 so that the weight indicated will be 37 lbs. when a load of that magnitude is resting on the platform.

It has been remarked before herein that, regardless of the load placed upon the scale platform, providing the price per pound is not too high, the cost indicating chart 30 will still indicate the true cost or product of the price per pound and the weight of the load. For example, if the load upon the platform happened to be 37 pounds and the unit price was 25 cents per pound, the chart 30 would indicate $9.25, the true cost of the load. If the unit price were 30 cents per pound, however, the product of 37 pounds and 30 cents per pound would be $11.10, which, of course, would result in more than one revolution of chart 30. The chart 30, instead of indicating $11.10, would only indicate $1.10, which is not the true product, therefore, means must be provided for taking care of cases where the product of the weight of the load and the unit price is in excess of $10.00 since the upper limit of the chart 30 is $9.99. In order to accomplish this result there is provided a series of weights 46 similar to the weights 35 both in general shape and proportions although their individual magnitudes are considerably less than the magnitudes of the weights 35 since a smaller pull is exerted upon the tape 22 than is exerted on the tape 21. The weights 46 are controlled by means of four cams 47 carried by a shaft 48 provided with a hand wheel 49 similar to the hand wheel 41. When the smallest weight 46 is lowered upon a pivot element 50, similar to the pivot element 36 and carried by the segmental lever 23, the effect produced will be to increase the indicating capacity of the cost indicating means 30 by $10.00. When the largest weight 46 is lowered upon the pivot element 50, the effect is to increase the indicating capacity of the cost indicating means 30 by $40.00. The other two weights 46 are each capable of increasing the cost indicating capacity of the scale 30 by $20.00. It is thus obvious that, by dropping weights 46 either singly or in combination, the indicating capacity of the cost indicating side of the scale may be increased from $10.00 to $100.00, inclusive, by increments of $10.00.

The hand wheel 49 is provided with an index cooperating with a dial which bears the numerals "0", "10", "20", . . . to "90" so that the operator of the scale may readily alter the indicating capacity of the cost indicating side of the apparatus at will by simply placing said index in register with any desired numeral on the dial. The shaft 48 is connected to an indicating drum 51, similar to the drum carrying the chart 42. This is done by means of bevel gears 52 one of which is rigidly mounted on shaft 48 while the other is secured to a short vertical shaft 53 having a universal connection with a shaft 54. The latter in turn has a universal connection with another short vertical shaft connected by means of bevel gears 55 and an arm 51a, like arm 42a, to the drum carrying the chart 51. It is obvious therefore that, when the index carried by the hand wheel 49 is brought to register with any desired numeral on the dial, the chart 51 will be turned to bring a related numeral into view through the sight opening provided for reading the charts 30 and 51. The chart 51 is provided with numerals 0 to 9 inclusive about the periphery thereof, these numerals representing tens of dollars. It is clear that, if a load of 37 pounds is placed upon the load platform and the unit price is 55 cents per pound, the cost will be $20.35, however, the drum 30 cannot indicate that value by itself, consequently the knob 49 must be turned to bring the index into register with the numeral 20 thereby dropping the corresponding weight 46 upon the pivot element 47 and also causing the chart 51 to turn an extent to bring the numeral 2 into view through the sight opening, it being understood, of course, that the hand wheel 41 will be turned to bring the index into register with the numeral 30 so that the weight indicated will be 37 pounds and the cost indicated will be $20.35.

It is clear that, by manipulating the hand wheel 49 in suitable manner, any product of unit price and weight of load upon the platform may be obtained from 0 to $99.99 and that in no case will the chart 30 have to make a full revolution in order to indicate the correct cost except when the price per pound is over $1.10.

It will be obvious, of course, that if a load of 99 pounds were placed upon the platform and the unit price was $1.10, the drum 30 would turn more than a full revolution, however, the maximum load and the maximum price will seldom, if ever, be needed in weighing operations.

It is obvious that when the weights 35 or the weights 46 are permitted to rest upon pivot element 36 or 47 the chart 30 will have a tendency to be reversely rotated to an extent depending upon the amount which the lever system can be backed up by the placing of said weights upon said pivot elements, however, as soon as the load is placed upon the platform the lever system will come into equilibrium and the true weight and true cost will be indicated by the respective indicators. At times there may be an element of uncertainty as to whether the chart 30 is going to turn more than a full revolution, in other words, the operator may not always know exactly where to set the index on the hand wheel 49 to prevent the chart 30 from turning a full revolution. If, when the load is placed upon the platform, the operator observes that the chart 30 or the chart 31 has turned more than a full revolution, he will merely need to turn one or both of the respective hand wheels 41, 48 to cause the charts 30, 31 to turn backwardly. In practice it will probably be found desirable to provide suitable stops so that the charts 30, 31 cannot be turned backwardly beyond zero therefore, it will be an easy matter to determine when it is necessary to apply combinations of the weight 35 or 46.

The present invention, for sake of convenience and to assist in understanding the principles upon which it is based, has been shown and described as embodied in a specific form and to a particular type of scale, however, its application is not in fact limited to the specific form or type of scale shown as it may be applied to other types as well and may be altered as to form and details in order to adapt the invention to the varying conditions found in practice.

I claim:

1. A scale having weighing mechanism, cost indicating mechanism, means connecting the weighing mechanism and the cost indicating mechanism and operated by the former for controlling the latter in accordance with unit price, means for increasing the capacity of the weighing mechanism, and means for varying the reading of the cost indicating mechanism in accordance with increases in the capacity of the weighing mechanism whereby to increase the capacity of the cost indicating mechanism in accordance with an increase in capacity of the weighing mechanism.

2. A scale having weighing mechanism, cost determining mechanism controlled by the weighing mechanism and including a cost chart movable by the weighing mechanism directly proportional to unit price and weight, means for varying the effect of the weighing mechanism upon the cost determining mechanism including a second cost chart movable relative to the first named chart, a plurality of counterbalancing devices adapted to be applied to said weighing mechanism, and operating means having connections to the second named cost chart and the counterbalancing devices for applying said devices to said weighing mechanism and for correspondingly effecting movement of the second named chart.

3. A scale having weighing mechanism, cost determining mechanism controlled by the weighing mechanism and settable according to unit price and including a cost indicator having an indicating limit fixed by the product of the normal capacity of the weighing mechanism and the highest unit price obtainable from the cost determining mechanism, means for increasing the capacity of the weighing mechanism beyond its normal capacity, and means for varying the reading of the cost indicator whereby to increase the cost indicating capacity of the scale in accordance with increases in the capacity of the weighing mechanism.

4. A scale having weighing mechanism, cost determining mechanism connected to the weighing mechanism and settable in accordance with unit price and having a cost determining limit fixed by the product of the normal capacity of the weighing mechanism and the highest unit price in accordance with which the cost determining mechanism may be set, counterbalancing means for increasing the capacity of the weighing mechanism, and a plurality of counterbalancing devices associated with the cost determining mechanism for increasing the capacity of the latter in accordance with an increase in capacity of the weighing mechanism.

5. A scale having weighing mechanism including a load support, a weight beam, and a load offsetting member connected to the weight beam; a price beam, price setting mechanism for controlling the price beam comprising a plurality of factor levers connected to the load support and the weight beam and adapted to be applied to the price beam in accordance with unit price, a cost indicator controlled by the price beam and having a cost indicating limit determined by the product of the normal weighing capacity of the scale and the highest unit price settable on the price setting mechanism, means for increasing the weighing capacity of the scale comprising an element connected to the weight beam and a plurality of load offsetting members adapted to be applied to said element, means for applying said members to said element, and means for varying the reading of the cost indicator whereby to increase the capacity of the latter in accordance with increases in capacity of the scale.

6. In a scale, a load support, a weight beam, a weight chart actuated by said beam, a price beam, a series of factor levers connected to the load support and to the weight beam and adapted to be applied to the price beam according to the unit price whereby to cause movement of the price beam proportional to the product of the weight of a load on the load support and the unit price, a cost indicator actuated by the price beam and having a definite normal cost indicating capacity, and means for varying the reading of the cost indicator whereby to extend the limit of the latter when the product of unit price and weight of load on the load support exceeds the normal indicating capacity of the cost indicator.

7. In a scale, weighing mechanism including a load support, a weight beam actuated by the load support, and a weight chart connected to the load support and having a normal weight indicating limit, a price beam, a series of factor levers adapted to connect the load support to the price beam in accordance with the unit price, a cost indicator actuated by the price beam, said indicator having a normal limit fixed by the product of the normal capacity of the weight chart and the highest unit price in accordance with which the factor levers may be connected to the load support, means for increasing the capacity of the weighing mechanism and automatically increasing the indicating capacity of the weight chart, and means for extending the normal limit of the cost indicator when the product of the weight of the load and the unit price exceeds the normal capacity of the cost indicator as a consequence of an increase in capacity of the weighing mechanism.

8. In a scale, weighing mechanism, cost computing mechanism settable in accordance with unit price and controlled by the weighing mechanism, said computing mechanism including a cost chart having a cost indicating limit determined by the product of the normal capacity of the weighing mechanism and the highest unit price according to which the cost computing mechanism may be set, means for increasing the capacity of the weighing mechanism, and auxiliary cost indicating means for extending the cost indicating limit of the scale in accordance with increases in capacity of the weighing mechanism.

9. A scale having weighing mechanism, a cost indicator, a plurality of factor levers adapted to connect the cost indicator with the weighing mechanism in accordance with unit price, means for increasing the capacity of the weighing mechanism, an auxiliary indicator, and means for operating said auxiliary indicator whereby to increase the auxiliary cost indicating capacity of the scale in accordance with increases in capacity of the weighing mechanism.

10. A cost indicating scale having a load support, a load offsetting means operated from the load support through a selectively variable leverage ratio means with means for indicating the displacement of the load offsetting means to indicate the cost of an article weighed on the load support at a selected price per unit of weight and including capacity weight means applicable to the load offsetting means upon the load offsetting side of the variable leverage ratio means for increasing the load offsetting capacity and thereby increasing the cost capacity of the scale.

11. A cost indicating scale having a load support, a load offsetting means operated from the load support through a selectively variable leverage ratio means with means for indicating the displacement of the load offsetting means to indicate the cost of an article weighed on the load support at a selected price per unit of weight and including capacity weight means applicable to the load offsetting means upon the load offsetting side of the variable leverage ratio means for increasing the load offsetting capacity and thereby increasing the cost capacity of the scale, means for applying said capacity weight means, said capacity weight applying means for the load offsetting means being provided with a supplemental cost indicator for indicating costs beyond the capacity of the cost indicator displaced by the load offsetting means.

12. A cost indicating scale having a load support, a cost indicating means and a weight indicating means, each having a cooperating load offsetting means, variable ratio connections, one load offsetting means for costs being operated through the variable ratio connections to the load support and the other load offsetting means being operable through fixed ratio connections to the load support, and means for independently increasing the load offsetting capacity of either or both of the aforesaid load offsetting means, such increase of capacity of any one load offsetting means not affecting the other load offsetting means whereby increased costs or weights, or both may be secured each independently of the other or both together.

13. A cost indicating scale having a load support, a load offsetting means operated from the load support through a selectively variable leverage ratio means with means for indicating the displacement of the load offsetting means to indicate the cost of an article weighed on the load support at a selected price per unit of weight and including capacity weight means applicable to the load offsetting means upon the load offsetting side of the variable leverage ratio means for increasing the load offsetting capacity and thereby increasing the cost capacity of the scale, weight indicating means operable by the load support, a load offsetting means for excess loads operable at a fixed leverage ratio with respect to the load support, and means for increasing the load offsetting capacity of the aforesaid load offsetting means for excess weights whereby weights beyond the capacity of the weight indicating means may be weighed.

14. A weighing scale including a load support, a load offsetting means with variable ratio devices intermediate the load support and the load offsetting means, cost indicating means operable with the load offsetting means for indicating the displacement of the load offsetting means and thereby indicating the cost of an article weighed upon the load support at a particular unit price, capacity changing means for increasing the load offsetting capacity of the said load offsetting means upon the load offsetting side of the variable ratio and additional cost indicating means operable with the capacity changing means whereby costs may be indicated which are beyond the normal capacity of the first mentioned cost indicating means.

15. A weighing scale comprising in combination a load support and automatic load counterbalancing means, variable ratio devices connecting said support and the load counterbalancing means, additional load counterbalancing means comprising drop weights having a factored relationship selectively applicable to the automatic load counterbalancing means to augment the effect thereof, and manually operable means for applying the additional counterbalancing means in predetermined sequence to the first named counterbalancing means.

16. A scale having weighing mechanism, a weight indicator controlled thereby, a cost indicator, means connecting the cost indicator with the weighing mechanism for operation by the latter in accordance with unit price, means for increasing the capacity of the weighing mechanism and simultaneously increasing the weight indicating capacity of the scale, an auxiliary cost indicator for increasing the cost indicating capacity of the scale, and means effective on the weighing mechanism for increasing the cost capacity and operably connected to said last named indicator to correspondingly increase the cost indicating capacity of the scale when the normal capacity of the scale is exceeded as a consequence of an increase in capacity of the weighing mechanism.

17. A scale of the character described having a cost determining mechanism comprising cost indicating means operable in accordance with the product of unit price and weight, a second cost indicating means positioned in cooperative relationship to the first-named indicating means and movable to a plurality of indicating positions for extending the range of the first-mentioned indicating means, and manual capacity changing means movable to a plurality of positions providing different cost determining ranges and operatively connected to the second cost indicating means for movement thereof relative to the first-mentioned cost indicating means in accordance with the positioning of the capacity changing means.

JAMES W. BRYCE.